UNITED STATES PATENT OFFICE.

HIPPOLYTE EUGÈNE SÉRULLAS AND FELIX EMMANUEL HOURANT, OF SURESNES, FRANCE.

PROCESS OF EXTRACTING AND PURIFYING GUTTA-PERCHA.

SPECIFICATION forming part of Letters Patent No. 575,739, dated January 26, 1897.

Application filed June 5, 1896. Serial No. 594,440. (No specimens.) Patented in France November 4, 1895, No. 251,417, and in Belgium December 18, 1895, No. 118,844.

*To all whom it may concern:*

Be it known that we, HIPPOLYTE EUGÈNE SÉRULLAS and FELIX EMMANUEL HOURANT, citizens of the French Republic, residing at Suresnes, near Paris, in the Republic of France, have invented new and useful Improvements in the Process of Extracting and Purifying Gutta-Percha, (for which we have obtained a French patent, No. 251,417, dated November 4, 1895, and a Belgian patent, No. 118,844, dated December 18, 1895,) of which the following is a specification.

The object of our invention is to extract from the leaves and other parts of the *Isonandra percha* the whole of the gutta contained therein by a novel process yielding a thoroughly dry and chemically-pure product which shall retain the three organic principles of gutta—namely, gutta-hydrocarbon, fluavil, and alban—unchanged, while preserving the original proportions of these substances as well as the color and latex or juice of the tree, the gutta-percha so extracted and purified possessing in a high degree all its original properties of plasticity and impregnability to water under pressure.

An advantage obtained by our process is that it enables the composition of *Bassia Parkii* to be assimilated to that of the *Isonandra percha* and its leaves and other vegetable parts to be treated in the same manner.

To carry our invention into effect, we first reduce the leaves or vegetable matter to be treated to a finely-powdered state by any ordinary method and then wash it in a cooling medium, such as petroleum ether, and afterward thoroughly dry it. The powdered substance when dried is dissolved in a hydrocarbon solution, preferably in a solution of dracyl, at a temperature near the boiling-point of that solvent, but with the important condition that the dracylic solution of gutta-percha is not reduced to absolute dryness. The solution may be slightly concentrated, provided that it retains intact the three principles of gutta, which have different degrees of solubility. Too great a concentration would have the effect of inevitably destroying the molecular equilibrium of the gum by producing a permanent change in its properties. The solution of gutta must accordingly be treated in the manner described below, which constitutes the principal feature of novelty in our process.

The dracylic solution of gutta-percha prepared as above, either slightly concentrated or in an unconcentrated state, is augmented when cold by three times its volume of acetone or some analogous medium which will precipitate completely and in bulk the gutta-hydrocarbon, fluavil, and alban, while retaining all the other substances in solution. After having been allowed to stand, preferably in a low temperature, for at least four or five hours the precipitate is separated, then washed in acetone, and finally dried by exposure. The precipitate is then actually identical with the latex or juice of the *Isonandra percha* purified and freshly coagulated. It has the same appearance, chemical composition, and structure. It is a gutta resembling a creamy mammilated mass, and under light pressure it readily assumes the appearance of large fibrous meshes adhering together with slight cohesion.

By subjecting the product prepared in the manner above described to heat in a closed vessel and stirring it it agglomerates, and after cooling becomes extremely tenacious.

Gutta-percha extracted and purified by the process above described retains all its original characteristics in a high degree and when once rolled becomes hard and flexible. Moreover, when subjected to heat it is readily softened and preserves remarkable plastic qualities, as well as impermeability to water under pressure.

What we claim as new, and desire to secure by Letters Patent of the United States, is—

1. A process of extracting and purifying gutta-percha, which consists in pulverizing the leaves or other parts of gutta-percha plants, dissolving this powder in a hydrocarbon solution, and then precipitating the three principal constituents of gutta-percha, namely, gutta-hydrocarbon, fluavil and alban.

2. A process of extracting and purifying gutta-percha, which consists in pulverizing the leaves or other parts of gutta-percha plants, dissolving this powder in a hydrocarbon solution, and then adding acetone which will precipitate the gutta-hydrocarbon, the fluavil and the alban.

In testimony whereof we have signed our names to this specification in the presence of two subscribing witnesses.

HIPPOLYTE EUGÈNE SÉRULLAS.
   FELIX EMMANUEL HOURANT.

Witnesses:
 LÈON FRANCKENS,
 CLYDE SHROPSHIRE.